US009068886B2

(12) United States Patent
Silny et al.

(10) Patent No.: US 9,068,886 B2
(45) Date of Patent: Jun. 30, 2015

(54) METHOD AND SYSTEM FOR VICARIOUS SPATIAL CHARACTERIZATION OF A REMOTE IMAGE SENSOR

(75) Inventors: John F. Silny, Playa Del Rey, CA (US); Stephen J. Schiller, La Mirada, CA (US)

(73) Assignee: Raytheon Company, Waltham, MA (US)

( * ) Notice: Subject to any disclaimer, the term of this patent is extended or adjusted under 35 U.S.C. 154(b) by 1152 days.

(21) Appl. No.: 13/194,185

(22) Filed: Jul. 29, 2011

(65) Prior Publication Data
US 2013/0027553 A1    Jan. 31, 2013

(51) Int. Cl.
G06K 9/00 (2006.01)
G06T 7/00 (2006.01)
G01J 1/42 (2006.01)
G01J 1/08 (2006.01)
G01J 3/28 (2006.01)

(52) U.S. Cl.
CPC .............. G01J 1/4228 (2013.01); G01J 1/08 (2013.01); G01J 3/2803 (2013.01)

(58) Field of Classification Search
CPC ..... G06T 7/0018; G06T 7/003; G06T 7/0036; G06T 2207/10032; G06T 2207/30181; G06T 2207/30212; G06K 9/00496; G06K 9/00536; G06K 9/00543; G06K 9/00624
USPC ................... 382/103, 100, 181, 201
See application file for complete search history.

(56) References Cited

U.S. PATENT DOCUMENTS

| | | | | |
|---|---|---|---|---|
| 7,212,938 | B2 * | 5/2007 | Mai ............................... | 702/104 |
| 7,228,005 | B1 * | 6/2007 | Yuan ............................. | 382/280 |
| 8,158,929 | B2 * | 4/2012 | Schiller ..................... | 250/252.1 |
| 2010/0032557 | A1 * | 2/2010 | Schiller ..................... | 250/252.1 |
| 2010/0080487 | A1 * | 4/2010 | Yitzhaky et al. ............. | 382/266 |

OTHER PUBLICATIONS

Helder, et al. "In-flight characterization of spatial quality using point spread functions." Trans. Array Post-Launch Calibration of Satellite Sensors Proceedings of the International Workshop on Radiometric and Geometric Calibration. London: Taylor & Francis, 2004. 149-170. Print.*
Thome, K. J. "Site Characterization for vicarious calibration of sensors." CEOS WGCV IVOS Workshop. CEOS. Italy, Ispra. Oct. 20, 2010. Presentation.*
Schiller, et al. "In-Flight Vicarious Calibration of High Spatial Resolution Remote Sensing Systems Using Specular Reflectors." JACIE Civil Commercial Imagery Evaluation Workshop. JACIE. Mar. 18, 2009. Presentation.*
Lagarias, et al. "Convergence Properties of the Nelder-Mead Simplex Method in Low Dimensions." SIAM J. Optim. 9.1 (1998): 112-147. Print.*

(Continued)

Primary Examiner — Michael A Newman
(74) Attorney, Agent, or Firm — Burns & Levinson LLP; Joseph M. Maraia

(57) ABSTRACT

A method and a system for vicarious characterization of a remote sensing sensor are described. The system includes a plurality of reflective mirrors configured and arranged to reflect radiation from a source of radiation onto a remotely located radiation sensor. The plurality of mirrors are spaced apart so as to obtain a plurality of distinct spot images on the remotely located radiation sensor. The system further includes a processor configured to analyze the plurality of spot images by fitting the images to obtain a point spread function of the remote sensing sensor.

13 Claims, 7 Drawing Sheets

(56) References Cited

OTHER PUBLICATIONS

Pagnutti, et al. "Targets, methods, and sites for assessing the in-flight spatial resolution of electro-optical data products." Can. J. Remote Sensing. 36.5 (2010): 583-601. Print.*

Vugrin, Kay. On the Effects of Noise on Parameter Identification Optimization Problems. Diss. Virginia Polytechnic Institute and State University, 2005. Print.*

Schiller et al.; "The Specular Array Radiometric Calibration (SPARC) Method: a new approach for absolute vicarious radiometric calibration in the solar reflective spectrum"; SPIE; Optics + Photonics Conference: Connecting minds for global solutions, San Diego, CA, U.S.A. [Presentation and Partial Program]; Aug. 1-5, 2010; 35 pages.

Choi et al.; "In-flight characterization of spatial quality using point spread functions"; Jan. 1, 2001, Proceedings of the International Workshop on Radiometric and Geometric Calibration, Taylor & Francis, pp. 151-170.

* cited by examiner

METHOD AND SYSTEM FOR VICARIOUS SPATIAL CHARACTERIZATION OF A REMOTE IMAGE SENSOR

BACKGROUND

This disclosure pertains generally to sensor characterization and in particular pertains to a method and system for vicarious spatial characterization of a remote image sensor. By vicarious characterization of a remote image sensor it is meant characterization of the image sensor after deployment of the image sensor to its operational environment (e.g., on an aircraft or spacecraft).

Airborne, and space-borne remote sensing systems for geospatial survey, observation, target recognition, and other applications are increasing in use. For example, the remote sensing systems may be employed to detect anthropogenic and natural effects in climate change, geologic morphology and chemistry, hydrology, vegetation health, as well as to identify and distinguish between friend and foe military targets (target recognition), drug operations, terrorist activities, damage assessment, and emergency routes for responding to natural disasters.

In order for the remote sensing system to operate as intended to quantify physical properties of an observed object, image data obtained by the remote sensing system and the physical properties of the observed object are quantitatively linked. Thus, providers of remote sensing systems strive to provide adequate methods for addressing stability and accuracy requirements imposed by the user community to define and validate sensor spectral, spatial, and radiometric performance, and in turn establish the level of confidence for data exploitation.

Development of panchromatic and multispectral sensing systems continue to move toward increasing spatial resolution in response to the fact that most targets of interest are contained in only a few pixels or even sub-pixel (i.e., an image area of the target is less than a pixel area). Generally, each image is composed of a plurality of pixels, with the radiation sensed by each pixel analyzed to determine the physical content and make up of the target contained in a pixel area. However, for small targets, blur spots due to optical diffraction, electronic readout, sensor motion, atmospheric scattering, or any combination thereof, as well as other potential natural phenomena or technical issues, can smear light into nearby pixels spatially disconnected from the target and thus blur the image of the object. Multispectral and hyperspectral sensors collect image data across a plurality (e.g., tens to hundreds) of spectral bands in which the blurring or smearing effect can vary with wavelength.

As a result, knowledge of the spatial performance (i.e., sensor point spread function) is applied as part of a calibration process so as to achieve effective small targets. Hence, one element in the operation of airborne and space-borne imaging systems is sensor calibration on the ground before launch or flight. However, physical conditions within the imaging system or conditions in the atmosphere between the imaging system and the desired target or object may change from the calibration laboratory setting in such a way so as to skew the calibration values. Therefore, the sensor characterization on the ground in the laboratory becomes suspect until validated after deployment of the sensor. The validation of the characterization after sensor deployment or vicarious characterization of the sensor provides an absolute information of the sensor characteristics to ensure validity of the laboratory or ground based characterization or to correct the laboratory characterization to take into account conditions that may have occurred after deployment of the sensor.

However, vicarious spatial characterization of an image sensor can be challenging. Prior methods for performing vicarious characterization of a remote image sensor use either large extended area bar targets, edge targets with varying levels of differential reflectance, or images of naturally occurring point sources such as stars. However, these methods have issues with either contrast (e.g., over large spectral ranges) and thermal management issues (particularly when Earth observing sensors slew to deep space).

Hence, there is a need in the art for a system and method for vicarious spatial characterization, i.e., characterization after deployment to a remote site, of a remote image sensor.

SUMMARY

One or more embodiments of the present disclosure provide a system for vicarious spatial characterization of a remote sensing sensor. The system includes a plurality of reflective mirrors configured and arranged to reflect radiation from a source of radiation onto a remotely located radiation sensor. The plurality of mirrors are spaced apart so as to obtain a plurality of distinct spot images on the remotely located radiation sensor. The system further includes a processor configured to analyze the plurality of spot images by fitting the images to obtain a point spread function of the remote sensing sensor.

Another embodiment of the present disclosure provides a method for vicarious spatial characterization of a remote sensing sensor. The method includes disposing a plurality of reflective mirrors on a surface, the mirrors being arranged to reflect radiation from a source of radiation onto a remotely located radiation sensor; detecting by the remotely located radiation sensor the radiation reflected by the plurality of mirrors as a plurality of spot images; and analyzing the plurality of spot images by executing an algorithm for fitting the spot images to obtain a point spread function of the remote sensing sensor.

Yet another embodiment of the present disclosure provides a computer program product comprising a computer readable medium having instructions stored thereon which, when executed by a processor, carries out functions comprising: fitting each of a plurality of spot images using a fitting function, the plurality of spot images originating from radiation reflected by a plurality of mirrors, the radiation being detected by a remotely located radiation sensor; determining a figure of merit describing an error of the fitting function for each of the plurality of spot images to obtain a plurality of figures of merit, calculating a combined figure of merit from the plurality of figures of merit, and minimizing the combined figure of merit to obtain a point spread function of the remote sensing sensor.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
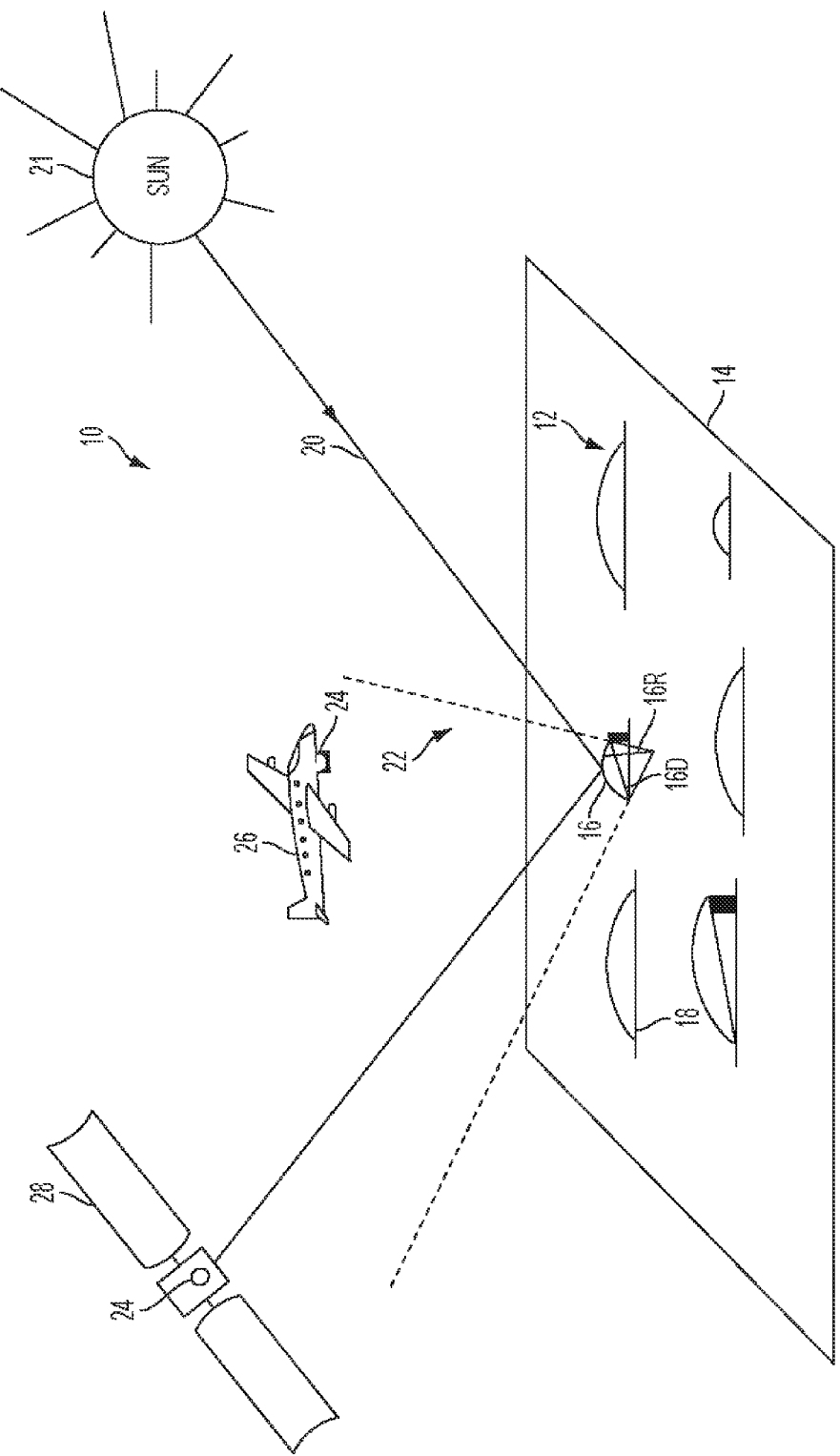
FIG. 1 schematically illustrates a perspective view of a vicarious spatial characterization system, according to one embodiment.

FIG. 1 schematically illustrates a perspective view of a vicarious spatial characterization system 10, according to one embodiment. As stated in the above paragraph by vicarious characterization it is meant characterization of an image sensor after deployment of the image sensor to its operational environment, e.g., space. The characterization system includes a target comprising a plurality of mirrors or reflectors 12 disposed upon background 14 so as to provide, for example, an array of reflective points upon the ground. Mirrors 12 can be configured to reflect the same amount of radiation or different amounts of radiation. Mirrors 12 can be convex, concave or flat reflectors. For example, mirrors 16 and 18 may be configured to reflect different intensity of directly incident sunlight 20 emanating from sun 21 due to a different radius of curvature. In one embodiment, background 14 may be a substantially uniform with a relatively low reflectance surface such as an asphalt pavement, a concrete area, a uniform grass patch, desert sand, sandy beach, etc. that is on the earth surface. In another embodiment, background 14 can also be any other type of surface that can be provided on an aircraft, a satellite, or a surface of the moon, i.e., mirrors 12 can be placed on the moon, satellite, etc.

In one embodiment, mirrors 12 can have different radii of curvature. For example, mirror 16 has a radius of curvature 16R and a base dimension 16D. The radius of curvature 16R and the base dimension 16D provide field of regard (FOR) 22. Remote sensor 24 to be characterized may be provided, for example, on board aircraft 26 or satellite 28. When within the field of regard of one or more of mirrors 12, for example mirror 16, at least a pixel of sensor 24 receives light from one or more mirrors 12, for example mirror 16, as depicted in FIG. 1.

Mirrors 12 may have different radii of curvature and base dimensions, and as such different individual fields of regard.

Each mirror 12 may be concave, convex, or flat. In the embodiment shown in FIG. 1, each mirror 12 is convex. Any mirror 12, for example mirror 16, can be angled relative to background 14 to direct a cone of radiation (field-of-regard) emanating from sun 21 (the source of radiation) toward sensor 24. For example, this can be accomplished, by raising one side of mirror 16, such as via an adjustable or static structure.

The brightness of each mirror 12 can be tuned, if desired, so that the image of mirrors 12 on sensor 24 do not saturate (too bright) or starve (too dark). However, knowing the absolute amount of light reflected by each mirror is not required. The user may merely adjust the relative brightness of the mirrors so that that it is bright enough to be detected by sensor 24 but not too bright to saturate sensor 24.

In one embodiment, mirrors 12 can be positioned on surface 14 with a known spacing to form, for example, an array of mirrors. For example, the spacing or distance between mirrors 12 can be selected so as to be greater than a minimum dimension that can be resolved by sensor 24 so as to obtain distinct images of the mirrors on sensor 24. In general, the absolute distance between mirrors 12 on surface 14 does not need to be known. Rather, it is sufficient to know that mirrors 12 are spaced far enough apart such that their images acquired by sensor 24 do not overlap. Likewise, it is sufficient to know mirrors 12 are not too far apart such that they are contained within a single image acquired by sensor 24.

Sensor or detector 24 can be placed on an airborne (e.g., aircraft) or space born platform (e.g. satellite). Sensor 24 can detect radiation in various wavelengths or wavelength ranges including the wavelength range between about 0.4 µm and about 15 µm which includes the visible range (between about 0.4 µm and about 0.7 µm), the near infrared range (between about 0.7 µm and about 1.4 µm), the short wavelength infrared (SWIR) range (between about 1.4 µm and about 3 µm), the mid-wavelength infrared (MWIR) range (between about 3 µm and about 8 µm) and at least a portion of the long-wavelength infrared (LWIR) range (between about 8 µm and about 15 µm). However, sensor or detector 24 can also be configured to detect in the ultraviolet wavelength range or even in the millimeter range or radiofrequency range if desired.

Figure 2A:
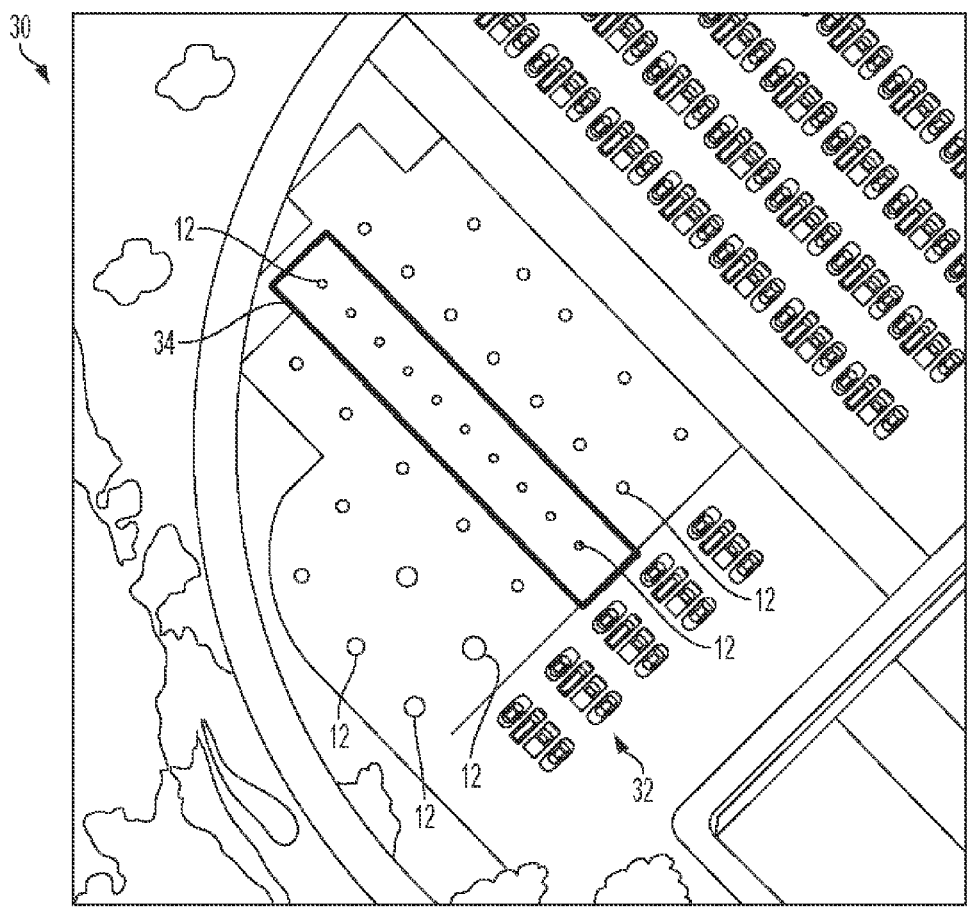
FIG. 2A depicts an aerial or spatial image captured by a remote image sensor, according to one embodiment.
Figure 2B:
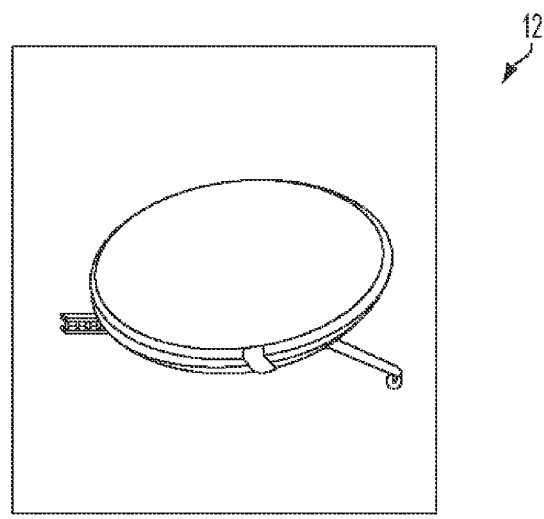
FIG. 2B depicts an example of a mirror mounted on a structure and oriented generally towards the remote sensor, according to one embodiment.

FIG. 2A depicts aerial or spatial image 30 captured by remote image sensor 24 of area 32 (e.g., in this case an empty parking lot) where mirrors 12 are positioned. As shown in FIG. 2A, in one embodiment, mirrors 12 are spaced apart to form an array. However, the mirrors do not need to be placed in a specific array with absolute known spacing, but can be arbitrarily laid out as long as mirrors 12 are spaced far enough apart such that their images are distinct and separate. The absolute position of each mirror 12 in area 32 may not be needed for the characterization of the sensor 24. FIG. 2B depicts an example of mirror 12 mounted on a structure and oriented generally towards sensor 24.

As depicted in FIG. 2A, each mirror 12 reflects radiation towards sensor 24 and the image of each mirror 12 appears as a distinct point image target or spot within the captured or acquired imaged data. In one embodiment, the size of each spot within the image can be about the size of one pixel of sensor 24. In some instances, the spot may be captured by a single pixel. However, in other instances, the spot may be captured by more than one pixel, for example two or more pixels. In which case, for example, a pixel in the plurality of pixels may contain only a portion of the spot. Additionally, if sensor 24 is experiencing an anomaly, or simply out of focus, the spots may be large and blurry. As a result, a sharpness of the image or the spatial resolution of the image may be affected. In order to quantify the image sharpness or spatial resolution, the image is analyzed by an algorithm (which is described in detail in the following paragraphs) that optimally co-registers the spots (i.e., the image of the different mirror targets) to provide an oversampling of the two-dimensional system point spread function of remote sensor 24. The two-dimensional (2-D) spatial characteristics or performance of remote sensor 24 can be extracted from the optimally registered system point spread function. For example, the effects of optical aberrations in the optics used in remote sensor 24 or defects in the image sensor itself (e.g., charge coupled device CCD or focal plane array FPA) in remote sensor 24 can be quantified.

The algorithm may implement a model for co-registering the images of different mirror targets. The term "co-registering" is used herein to mean that the images of the different mirrors or spots are superimposed at a same position. In one embodiment, the model can be a 2-D Gaussian model or based on a 2-D Gaussian function. For example, in a 2-D Gaussian model, the spot or point spread function of each mirror on the image is assumed to have a Gaussian shape. Although in the following paragraphs the algorithm will be described with reference to a Gaussian model, as it can be appreciated any other mathematical model or 2-D function can be used, such as, but not limited to, a Lorentzian function. Alternatively, instead of using a function (e.g. a Gaussian function, a Lorentzian function, etc.), a look-up table can be used.

For example in the case of a 2-D Gaussian model, the following function (1) can be used.

$$z(x, y) = a \exp\left\{-\alpha\left[\left(\frac{x-b_x}{c_x}\right)^2 + \left(\frac{y-b_y}{c_y}\right)^2\right]\right\} + d, \quad (1)$$

where:
a is the amplitude,
$\alpha$ is a scaling constant where 4 ln (2) yields full width at half maximum (FWHM),
$b_x$ is the center position of the spot in the x-direction on the image,
$b_y$ is the center position of the spot in the y-direction on the image,
$c_x$ is the width (FWHM) of the spot in the x-direction,
$c_y$ is the width (FWHM) of the spot in the y-direction, and
d is the offset or background signal in the image.

Although in the 2-D Gaussian model it is assumed, by only using an offset parameter d, that the background is relatively flat and does not vary in the x-direction and y-direction, the offset parameter d can be augmented with a sloped term in x-direction, in y-direction, or both. Other higher order terms can also be used to account for variability in the background.

Figure 3:
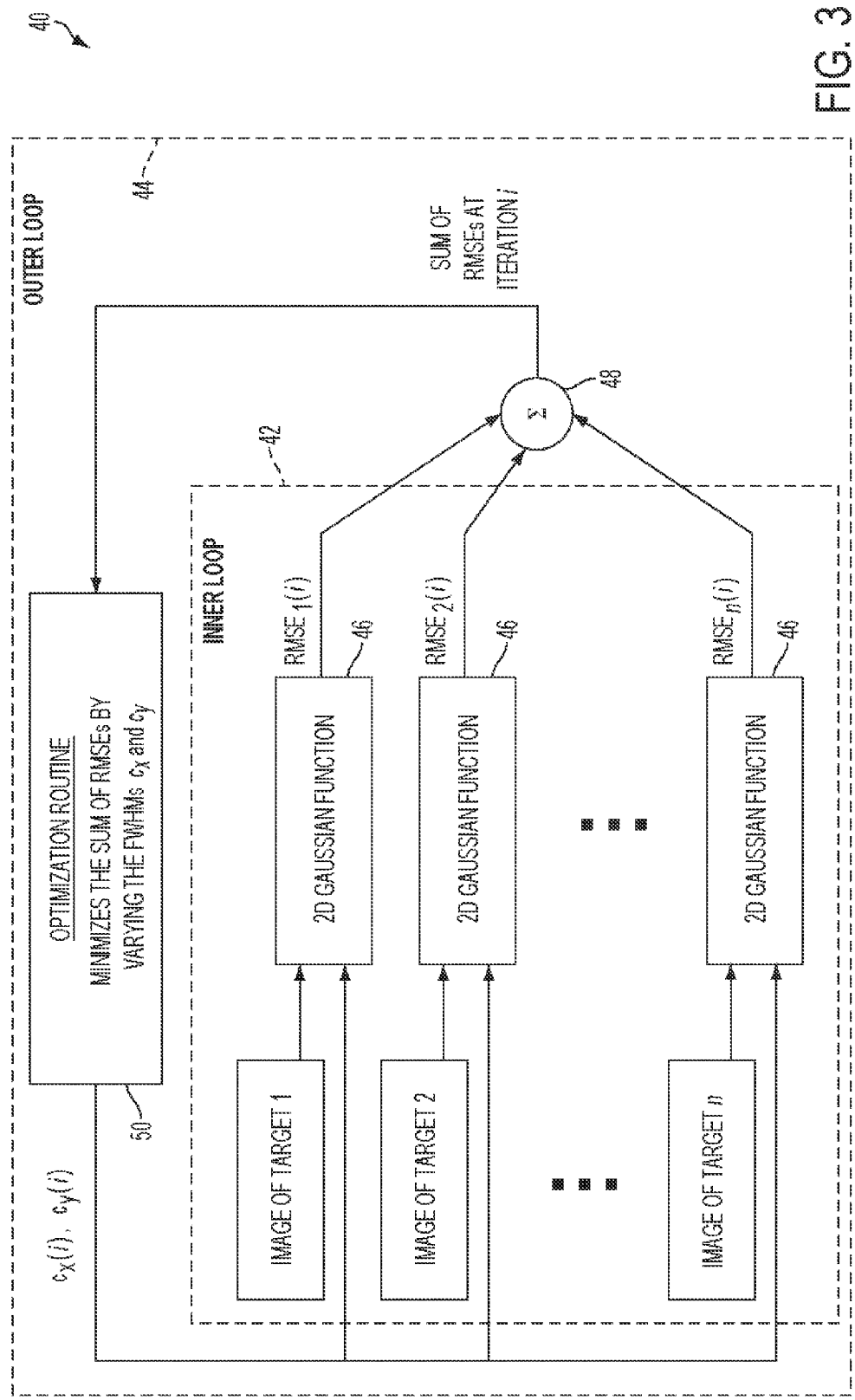
FIG. 3 depicts flow diagram of an algorithm to optimally co-register point image mirror targets, according to one embodiment.

FIG. 3 depicts flow diagram 40 of the algorithm to optimally co-register point image mirror targets, according to one embodiment. The algorithm runs two loops, an inner loop 42 and an outer loop 44. In inner loop 42, for each image of target mirrors 12, i.e., for each spot on the image (image of target 1, image of target 2, ... image of target n) a fitting procedure is run using 2-D Gaussian fitting function 46 (e.g., function (1)) to determine the best fitting parameters a, $b_x$, $b_y$, and d of the Gaussian function (1) for each of the spots (image target 1, image target 2, ..., image target n), i.e., to determine the best fitting Gaussian shape for each individual spot. Hence, in the first loop 42, parameters a, $b_x$, $b_y$, and d in the 2-D Gaussian function are allowed to freely vary during the fitting procedure to find the best fitting 2-D Gaussian shape for each spot, individually. Parameters $c_x$, $c_y$, which represent the FWHM, are on the other hand fixed within the inner loop 42. For example, the parameters $c_x$, and $c_y$ can be initially approximated and provided initial values to run the fitting procedure. For each 2-D Gaussian fit function 46 associated with a corresponding spot (image of target 1, image of target 2, ..., image of target n) a root mean square error (RMSE) is determined. However, other figures of merit (such as the sum of absolute differences) may also be used. For example, for image of target 1, a best fit 2-D Gaussian function can be determined and the $RMSE_1(i)$ of this fit quantified. Similarly, for image of target 2, a best fit 2-D Gaussian function is determined and the $RMSE_2(i)$ of this fit quantified. Hence, for image of target n, a best fit 2-D Gaussian function is determined and the $RMSE_n(i)$ of this fit quantified.

In a subsequent operation, the various RMSEs ($RMSE_1(i)$, $RMSE_2(i)$, ..., $RMSE_n(i)$) of the various 2-D Gaussian fit functions are then summed with summation operation 48 to obtain the sum of all RMSEs ($RMSE_1(i)+RMSE_2(i)$, ..., + $RMSE_n(i)$. Although not shown, a weighted summation or other mathematical operation can be used here to account for the total fit error across all fits. In outer loop 44, an optimization procedure 50 is implemented where the sum of all RMSEs is minimized by varying the FWHMs parameters $c_x$ and $c_y$ of each 2-D Gaussian function best fit for each spot (image of target 1, image of target 2, ... image of target n). Optimization routine 50 may use any form of optimizer and any figure of merit.

Figure 4:
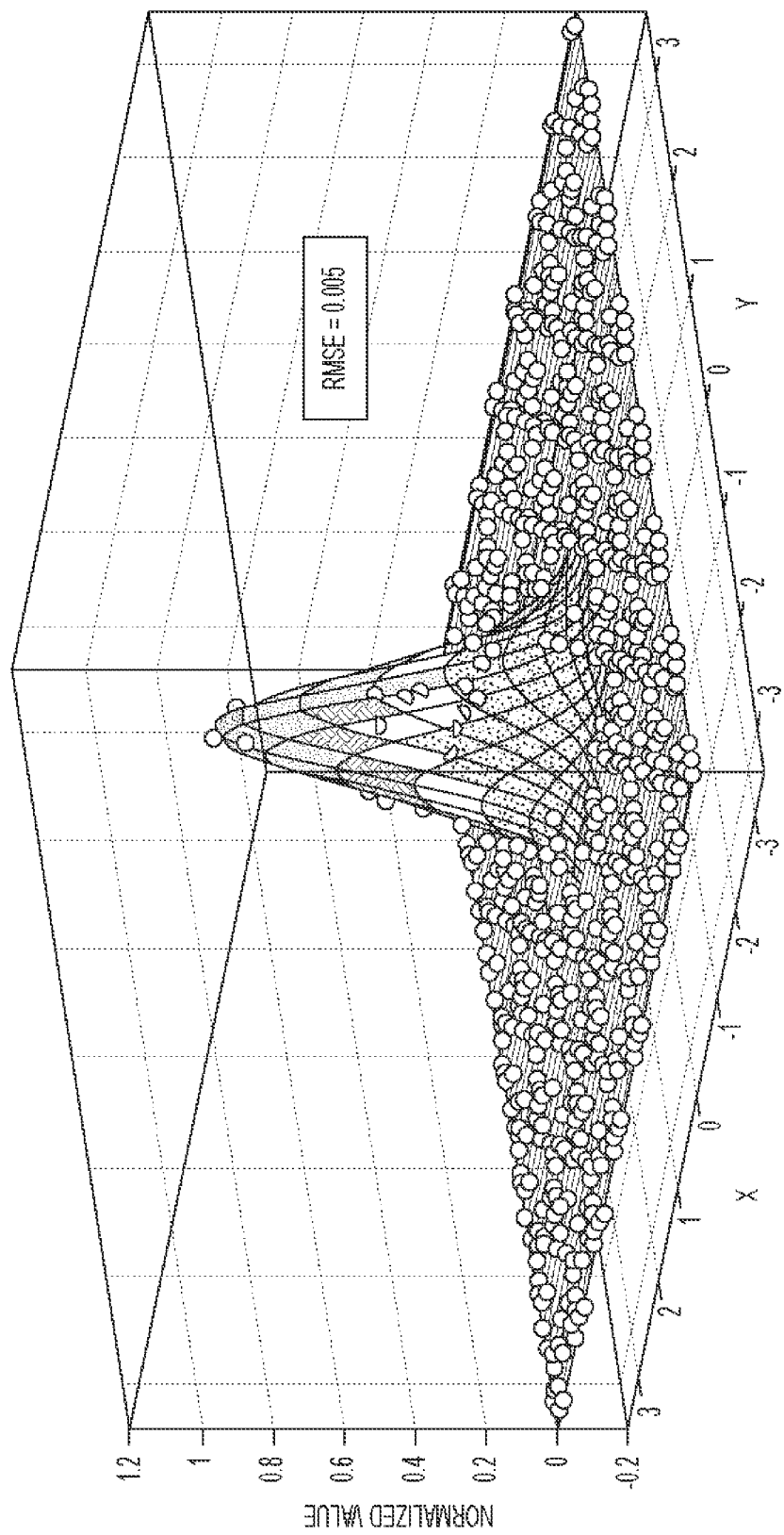
FIG. 4 is a three-dimensional plot of a two-dimensional fit function corresponding to the measured system point spread function, according to one embodiment.

In one embodiment, the optimization procedure converges to obtain a minimum of the sum of all RMSEs (MIN-ΣRMSEs). In one embodiment, the 2-D Gaussian fit functions corresponding to each spot target image (image of target 1, image of target 2, ..., image of target n) can be displayed together on same 3-D plot and fit with a final 2-D Gaussian function as shown in FIG. 4 where each of the data points from the spots is shifted in x-direction and y-direction to a same position, for example, to origin (0,0) so as to superimpose and co-register the images of all mirror targets within the image. The shifting to origin can be done by subtracting the fit parameters $b_x$ and $b_y$ from each set of data points. As shown in FIG. 4, the final obtained RMSE after co-registering the different spots is equal to approximately 0.005 (i.e., 0.5%). As a result, an accurate composite registered point spread function can be obtained from a plurality of mirror images or reflector images. Any number of mirror images can be used and even from different scene images acquired at different times. However, as it can be appreciated, using a greater number of mirror images allows one to obtain a more accurate vicarious characterization of remote sensor 24. For example, in the above described algorithm to optimally co-register point spread function, ten spots within rectangle 34 in image 30 shown in FIG. 2A are used in this algorithm.

Figure 5:
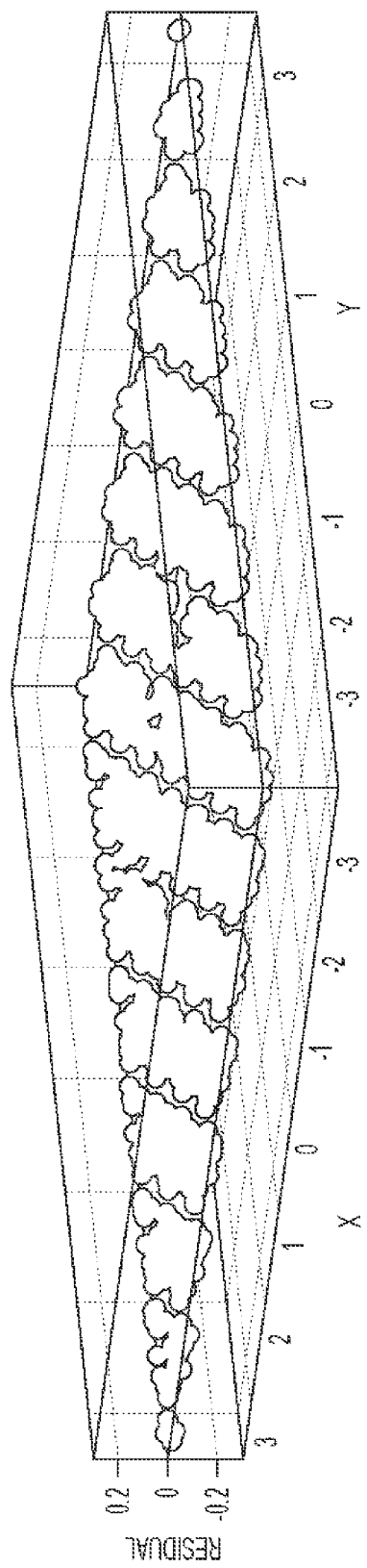
FIG. 5 shows a plot of the residual value as a function of x and y for the 2-D fit function shown in FIG. 4.

FIG. 5 shows a plot of the residual value, i.e., the difference between the measured intensity value and the fitted or calculated intensity value, as a function of x and y for the 2-D Gaussian fit shown in FIG. 4. As can be seen in FIG. 5, the residual value is substantially flat and equal to approximately zero showing that the fit obtained using the 2-D Gaussian function is a good fit.

Figure 6A:
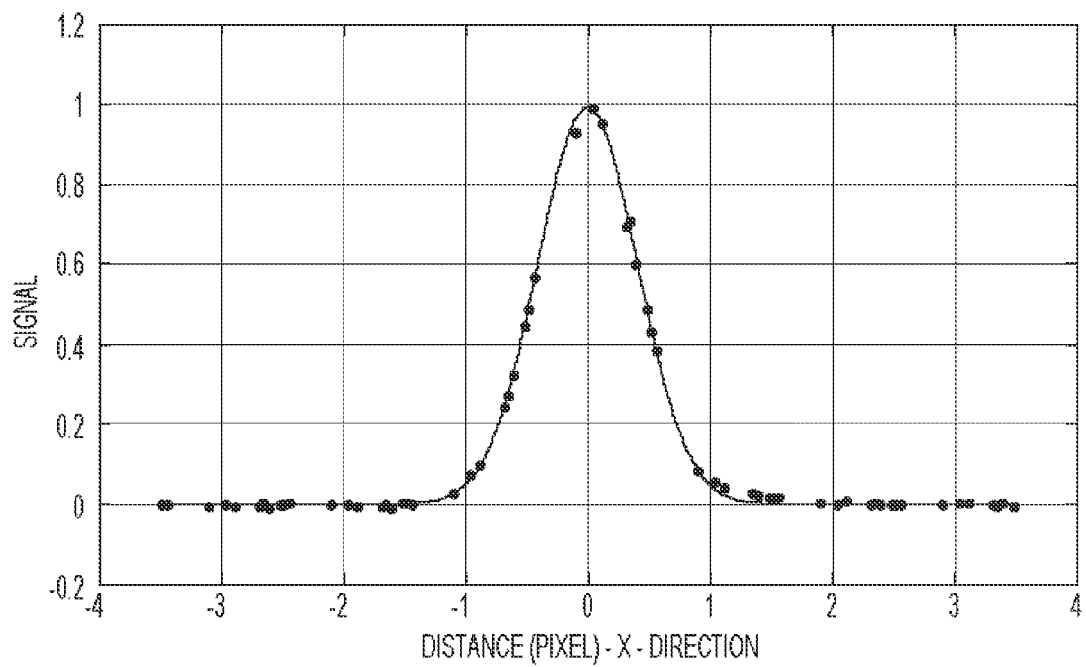
FIG. 6A is 2-D plot of a 1-D Gaussian function fit in the x-direction, according to one embodiment.
Figure 6B:
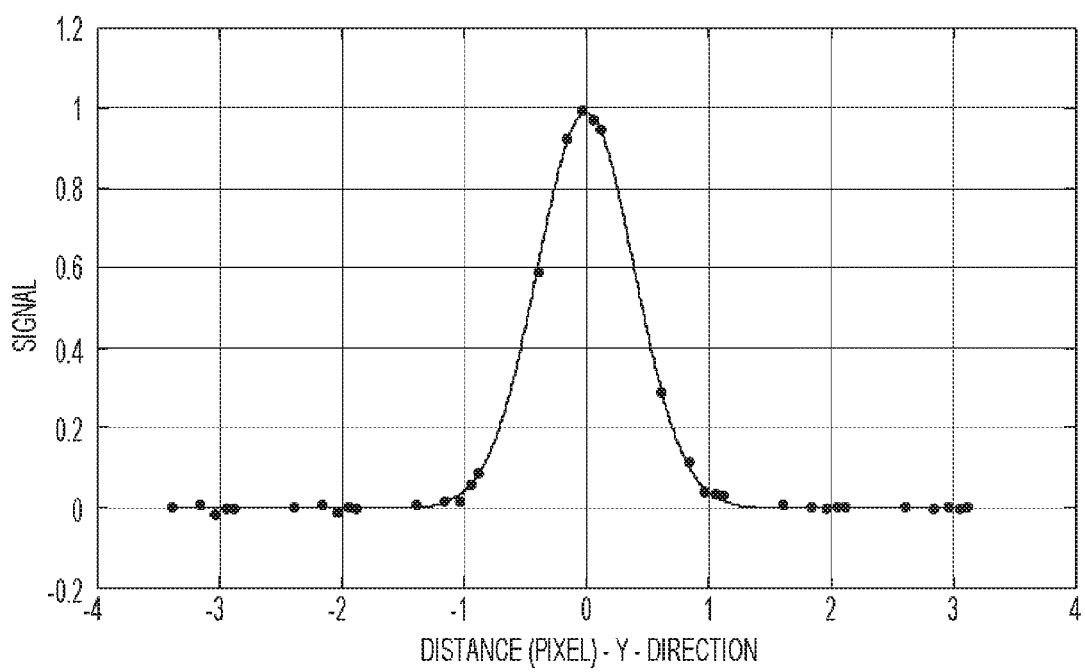
FIG. 6B is a 2-D plot of a 1-D Gaussian function fit in the y-direction, according to one embodiment.

FIGS. 6A and 6B depict a plot of a response function curve fit along the x-direction and the y-direction, respectively, according to one embodiment. FIG. 6A is 2-D plot of a 1-D Gaussian function fit in the x-direction (function (2)) and FIG. 6B is a 2-D plot of a 1-D Gaussian function fit in the y-direction (function (3)).

The Gaussian fit function (2) and parameters for the plot shown in FIG. 6A are as follows:

$$z = a \exp\left[-\alpha\left(\frac{x}{c}\right)^2\right], \quad (2)$$

Where $\alpha = 2 \ln(4) \approx 2.77$
 $a = 0.99 \pm 0.004$
 $c = 0.96 \pm 0.004$ pixel, and
 the obtained RMSE for the fit shown in FIG. 6A is approximately 0.0077.

The Gaussian fit function (3) and parameters for the plot shown in FIG. 6B are as follows:

$$z = a \exp\left[-\alpha\left(\frac{y}{c}\right)^2\right], \quad (3)$$

Where $\alpha = 2 \ln(4) \approx 2.77$
 $a = 0.99 \pm 0.005$
 $c = 0.93 \pm 0.007$ pixel, and
 the obtained RMSE for the fit shown in FIG. 6A is approximately 0.0091.

The RMSE value indicates the extent to which the fit of the individual target images converge to obtain a minimal RMSE value. In addition, the 1-D or 2-D point spread function of the optimally registered system provides the information on the spatial resolution of remote sensor 24. For example, if the FWHM of the fit function is P pixel (e.g., one pixel), two adjacent image targets or spots can be resolved if a spacing between centers of the image targets (i.e., maxima of the functions fitting the image targets) is greater or equal to 2P pixels (e.g., two pixels). Other separation distances, such as that described by the Rayleigh criterion, can be used to define the minimum separation required for two point sources to be spatially resolved. As it can be appreciated, the unit pixel can be converted into dimensional length, such as meter, inch, foot, or any desired dimensional unit. Therefore, by determining the FWHM or the c-parameter (parameter $c_x$, parameter $c_y$, or both) of the fit function, the resolution of the remote sensor can be quantified. Furthermore, the system point spread function can be converted to the spatial frequency domain and represented as a modulation transfer function (MTF). Further mathematical transformation can yield an edge response function for the x-dimension and y-dimension from which a relative edge response (RER) metric can be calculated. Such a metric is ideal for use within a general image quality equation (GIQE) for national image interpretability rating scale (NIIRS) validations. The present system and method further provides the ability to measure spatial resolution over a broad wavelength range (e.g., from ultraviolet to LWIR and beyond depending on the application sought for the remote sensor).

Therefore, as it can be appreciated, the target or mirrors can be configured to reflect any portion of the wavelength spectrum including, without limitation, the wavelength range between about 0.4 μm and about 15 μm which includes the visible range (between about 0.4 μm and about 0.7 μm), the near infrared (NIR) range (between about 0.7 μm and about 1.4 μm), the short wavelength infrared (SWIR) range (between about 1.4 μm and about 3 μm), the mid-wavelength infrared (MWIR) range (between about 3 μm and about 8 μm) and at least a portion of the long-wavelength infrared (LWIR) range (between about 8 μm and about 15 μm). The target or mirrors within the target can also be configured to reflect any portion of the wavelength spectrum including, ultraviolet portions, millimeter wave and/or radio frequency portions if so desired.

Furthermore, although the sun is described in the above paragraphs as the source emitting the radiation that is reflected by the target mirrors, it is also contemplated that an artificial source such as a laser, a lamp or a plurality of lamps (e.g., one or more xenon lamps) can be used.

In one embodiment, the algorithm or method according to one embodiment may be executed by a processor on a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Figure 7:
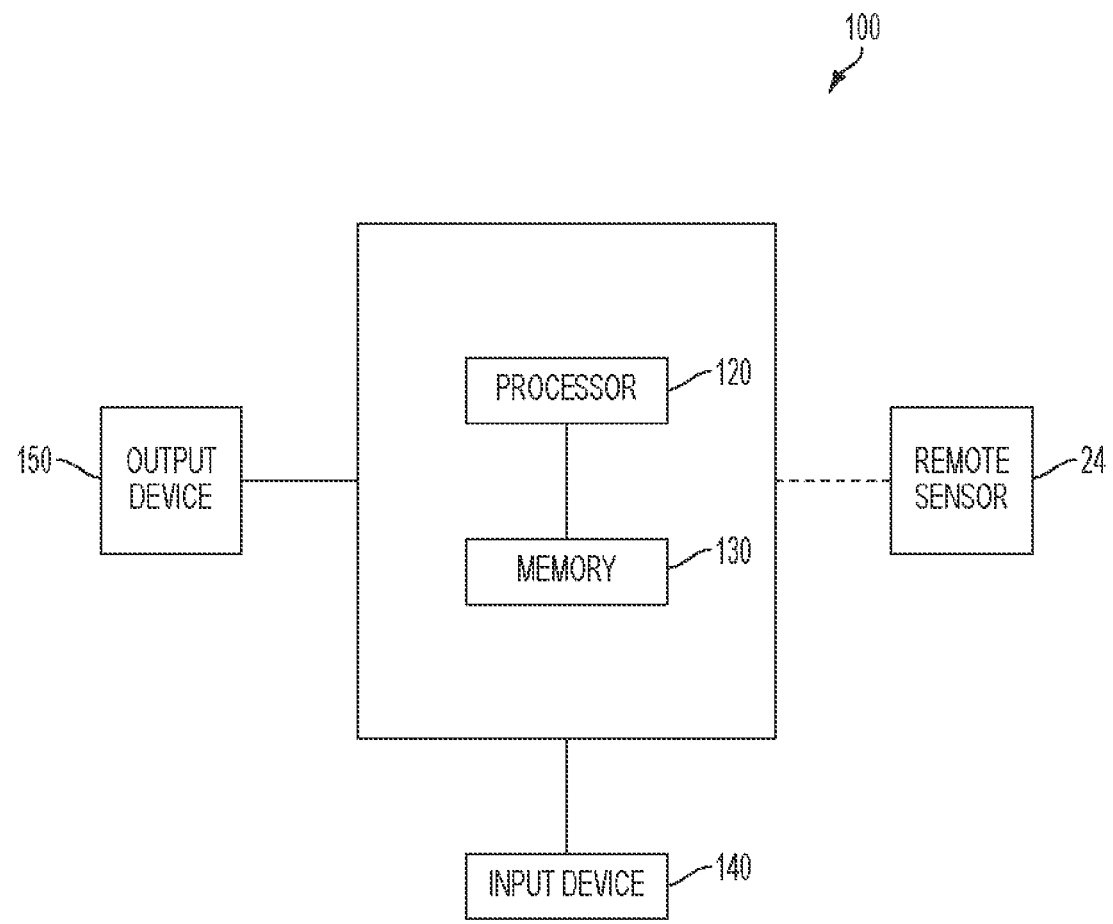
FIG. 7 is a schematic diagram representing a computer system for implementing the algorithm or method to optimally co-register point images of mirror targets, according to an embodiment.

FIG. 7 is a schematic diagram representing computer system 100 for implementing the algorithm or method, according to an embodiment. As shown in FIG. 7, computer system 100 comprises processor (e.g., one or more processors) 120 and memory 130 in communication with processor 120. Computer system 100 may further include input device 140 for inputting data (such as keyboard, a mouse or the like) and output device 150 such as a display device for displaying results of the computation. In one embodiment, image data acquired by sensor 24 is input into computer 100, e.g., transmitted to or downloaded by computer 100, and stored in memory 130. The image data can be processed or analyzed by processor 120 by executing the algorithm described in the above paragraphs.

As can be appreciated from the above description, computer readable memory 130 can be configured to store the image data. Computer processor 120 in communication with computer readable memory 130 can be configured to: (i) fit each of a plurality of spot images using a fitting function, the plurality of spot images originating from radiation reflected by a plurality of mirrors the radiation and being detected by a remotely located radiation sensor; (ii) determine a figure of merit describing an error of the fitting function for each of the plurality of spot images to obtain a plurality of figures of merit; (iii) calculate a combined figure of merit from the plurality of figures of merit; and (iv) minimize the combined figure of merit to obtain a point spread function of the remote sensing sensor.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

STATEMENT OF INDUSTRIAL APPLICABILITY

This disclosure has application in sensor characterization, particularly vicarious spatial characterization of remote image sensors.

What is claimed:

1. A system for vicarious spatial characterization of a remote sensing sensor, comprising:
    a processor configured to analyze a plurality of distinct spot images by fitting the images to obtain a point spread function of a remote sensing sensor;
    the processor further configured to execute an algorithm for fitting the images, wherein the algorithm includes:
        fitting each of the plurality of spot images using a fitting function,
        determining a root mean square error of the fitting function for each of the plurality of images to obtain a plurality of root mean square errors,
        calculating a sum of all the root mean square errors, and
        minimizing the sum of all the root mean square errors to obtain a point spread function of the remote sensing sensor; and
    wherein the processor is further configured to execute a first loop to fit each of the plurality of spot images without varying a full width at half maximum parameter of the fitting function, and execute a second loop to minimize the sum of all the root mean square errors.

2. The system of claim 1, wherein the processor is further configured to shift the fitting function of each of the plurality of spot images so as to superimpose the fitting function corresponding to each spot image to obtain co-registered fitting functions.

3. The system of claim 1, wherein the fitting function is a two-dimensional Gaussian fitting function.

4. The system of claim 1, wherein the remotely located radiation sensor is located on an aircraft or a satellite.

5. The system of claim 1, wherein a spatial characteristic of the sensor is determined from the point spread function of the sensor.

6. The system of claim 5, wherein the spatial characteristic comprises a spatial resolution of the sensor.

7. The system of claim 6, wherein the spatial resolution of the system is determined from the full width at half maximum of the fitting function.

8. A method for vicarious spatial characterization of a remote sensing sensor, comprising:
    detecting by a remotely located radiation sensor radiation reflected by a plurality of mirrors as a plurality of spot images;
    analyzing the plurality of spot images by executing an algorithm for fitting the spot images to obtain a point spread function of the remote sensing sensor;
    fitting each of the plurality of spot images using a fitting function;
    determining a root mean square error of the fitting function for each of the plurality of images to obtain a plurality of root mean square errors;
    calculating a sum of all the root mean square errors;
    minimizing the sum of all the root mean square errors to obtain a point spread function of the remote sensing sensor; and
    fitting each of the plurality of spot images without varying a full width at half maximum parameter of the fitting function, and minimizing the sum of all the root mean square errors.

9. The method of claim 8, further comprising shifting the fitting function of each of the plurality of spot images so as to superimpose a fitting function corresponding to each spot image to obtain co-registered fitting functions.

10. The method of claim 8, further comprising determining a spatial characteristic of the sensor from the point spread function of the sensor.

11. The system of claim 10, wherein determining the spatial characteristic comprises determining a spatial resolution of the remote sensor.

12. The method of claim 11, wherein determining the spatial resolution comprises determining the spatial resolution from the full width at half maximum of the fitting function.

13. A computer program product comprising a non-transitory computer readable medium having instructions stored thereon which, when executed by a processor, carries out functions comprising:
    fitting each of a plurality of spot images using a fitting function;
    determining a root mean square error of the fitting function for each of the plurality of images to obtain a plurality of root mean square errors,
    calculating a sum of all the root mean square errors,
    minimizing the sum of all the root mean square errors to obtain a point spread function of the remote sensing sensor; and
    fitting each of the plurality of spot images without varying a full width at half maximum parameter of the fitting function, and minimizing the sum of all the root mean square errors.

* * * * *